(12) United States Patent
Chanez et al.

(10) Patent No.: US 8,684,302 B2
(45) Date of Patent: Apr. 1, 2014

(54) AIRPLANE HAVING ENGINES PARTIALLY ENCASED IN THE FUSELAGE

(75) Inventors: Philippe Gerard Chanez, Paris (FR); Jean-Loic Herve Lecordix, Blandy les Tours (FR); Stephane Jacques Francois Thomas, Coubert (FR)

(73) Assignee: SNECMA, Paris (FR)

( * ) Notice: Subject to any disclaimer, the term of this patent is extended or adjusted under 35 U.S.C. 154(b) by 350 days.

(21) Appl. No.: 13/061,634

(22) PCT Filed: Oct. 28, 2009

(86) PCT No.: PCT/FR2009/001256
§ 371 (c)(1),
(2), (4) Date: Mar. 1, 2011

(87) PCT Pub. No.: WO2010/049610
PCT Pub. Date: May 6, 2010

(65) Prior Publication Data
US 2011/0163207 A1      Jul. 7, 2011

(30) Foreign Application Priority Data
Oct. 30, 2008   (FR) ..................................... 08 06052

(51) Int. Cl.
*B64D 27/20*   (2006.01)
(52) U.S. Cl.
USPC ...................... 244/53 B; 137/15.1

(58) Field of Classification Search
USPC .......... 244/53 B, 53 R, 54, 55, 58; 137/15.1; D12/342
See application file for complete search history.

(56) References Cited

U.S. PATENT DOCUMENTS

| | | | | |
|---|---|---|---|---|
| 3,667,703 A | * | 6/1972 | Boek | 244/53 B |
| 3,667,704 A | * | 6/1972 | Assmann | 244/53 B |
| 4,452,266 A | * | 6/1984 | Ogino et al. | 137/15.1 |
| 7,520,470 B2 | * | 4/2009 | Lucchesini et al. | 244/199.1 |
| 7,837,142 B2 | * | 11/2010 | Chase et al. | 244/53 B |
| 2010/0038472 A1 | * | 2/2010 | Cazals et al. | 244/54 |

FOREIGN PATENT DOCUMENTS

GB      1 463 810      2/1977

OTHER PUBLICATIONS

International Search Report Issued Mar. 10, 2010 in PCT/FR09/001256 filed Oct. 28, 2009.

* cited by examiner

*Primary Examiner* — Tien Dinh
*Assistant Examiner* — Michael Kreiner
(74) *Attorney, Agent, or Firm* — Oblon, Spivak, McClelland, Maier & Neustadt, L.L.P.

(57) ABSTRACT

An airplane provided with dual-flow turbojet engines having nacelles at least partially encased in the fuselage, wherein the air intake of each engine is connected to the fuselage by two boundary layer guiding walls, the walls extending towards the upstream side of the air intake and being spaced apart towards the upstream side.

11 Claims, 2 Drawing Sheets

AIRPLANE HAVING ENGINES PARTIALLY ENCASED IN THE FUSELAGE

BACKGROUND OF THE INVENTION

1. Field of the Invention

The present invention relates to a civil airplane fitted with bypass turbojet engines having nacelles that are partially embedded in the fuselage of the airplane.

2. Description of the Related Art

Present civil airplanes are propelled by turbojets mounted under the wings or in a rear position on the fuselage, and they are attached thereto by means of pylons.

In the context of reducing fuel consumption, engine manufacturers are turning towards partially embedding engines inside the fuselage, thus making it possible to eliminate the pylons and their fairings and consequently reducing the weight of the propulsion assembly. Furthermore, partially integrating the engines in the fuselage enables the diameter of the engines to be increased, thus making it possible to envisage using engines having a very large bypass ratio. Finally, reducing the area of the nacelle that is in contact with air flowing around the airplane serves to reduce drag.

In flight, a boundary layer at substantially zero speed is formed around the fuselage of the airplane and generates aerodynamic drag. It has long been thought that engines ought not to ingest the boundary layer since that could give rise to major distortion in the fan and to shaft vibration, so airplanes have been fitted with boundary layer "traps" that are situated upstream from the air intakes of engines that are partially embedded. Nevertheless, more recent studies have shown that absorbing a portion of the boundary layer in the engines makes it possible significantly to reduce the aerodynamic drag of the airplane and to reduce the speed of the air penetrating into the engines, and thus to increase the efficiency thereof.

BRIEF SUMMARY OF THE INVENTION

A particular object of the present invention is to reduce the fuel consumption of an airplane by limiting its aerodynamic drag by absorbing the boundary layer.

To this end, the invention provides an airplane fitted with bypass turbojet engines having nacelles that are embedded at least in part in the fuselage of the airplane, the airplane being characterized in that the air intake of each engine is connected to the fuselage by two boundary layer guide walls, these walls extending upstream from the air intake and flaring apart from each other in the upstream direction.

For each engine, two walls are thus integrated in the fuselage upstream from the air intake of the engine, which walls converge towards each other going towards the air intake and form a half-chute or half-funnel for collecting and guiding the boundary layer. In operation, the boundary layer is guided towards the air intake of the engine over an extent that is wider than the air intake of the engine, thus enabling the aerodynamic drag of the airplane to be reduced further. This greater absorption of the boundary layer also makes it possible to increase the efficiency of the engine by reducing the speed of the air at its intake.

Advantageously, the guide walls are of a height relative to the fuselage that increases going from their upstream ends to the air intake of each engine, thus making it possible in the vicinity of the engine to recover and to absorb into the engine a maximum amount of boundary layer and to reduce parasitic turbulence around the engine.

The guide walls may be at an angle of about 25° to 50° relative to each other.

The guide walls of each engine may also be curved with a concave side facing towards the space situated between the two guide walls, thus serving to improve the guidance of the air of the boundary layer compared with guide walls that are plane.

According to another feature of the invention, the guide walls extend between the fuselage and peripheral points of the air intake that are spaced apart from the fuselage, and for which the radii that connect said points to the axis of the engine form between them an angle lying in the range 120° to 180°.

According to yet another feature of the invention, the portion of the fuselage situated between the two guide walls has an S-shaped profile with a concave side towards the air intake of the engine, thus enabling the air to be accelerated between the two guide walls, and enabling the air suction effect to be increased and improving boundary layer absorption.

The combined use of guide walls and of S-shaped profiles enables boundary layer absorption by each engine to be doubled.

According to another feature of the invention, only the upstream portion of the nacelle is embedded in the fuselage, thus enabling hot gas to be ejected outside the fuselage and at a distance therefrom.

Advantageously, the upstream portion of each nacelle embedded in the fuselage corresponds to at least one-third and to at most 50% of the periphery of the nacelle.

Advantageously, the downstream end of each engine is spaced apart from the fuselage and is connected to the fuselage by a plane wall extending downstream from the engine over the entire area of the space between the engine and the fuselage. This wall thus provides the fuselage with thermal protection firstly by preventing the hot gas stream ejected by the engine coming into contact with the fuselage and secondly by avoiding turbulence forming between the downstream portion of the engine and the fuselage.

BRIEF DESCRIPTION OF THE SEVERAL VIEWS OF THE DRAWINGS

The invention can be better understood and other details, advantages, and characteristics of the invention appear on reading the following description made by way of non-limiting example and with reference to the accompanying drawings, in which.

DETAILED DESCRIPTION OF THE INVENTION

Figure 1:
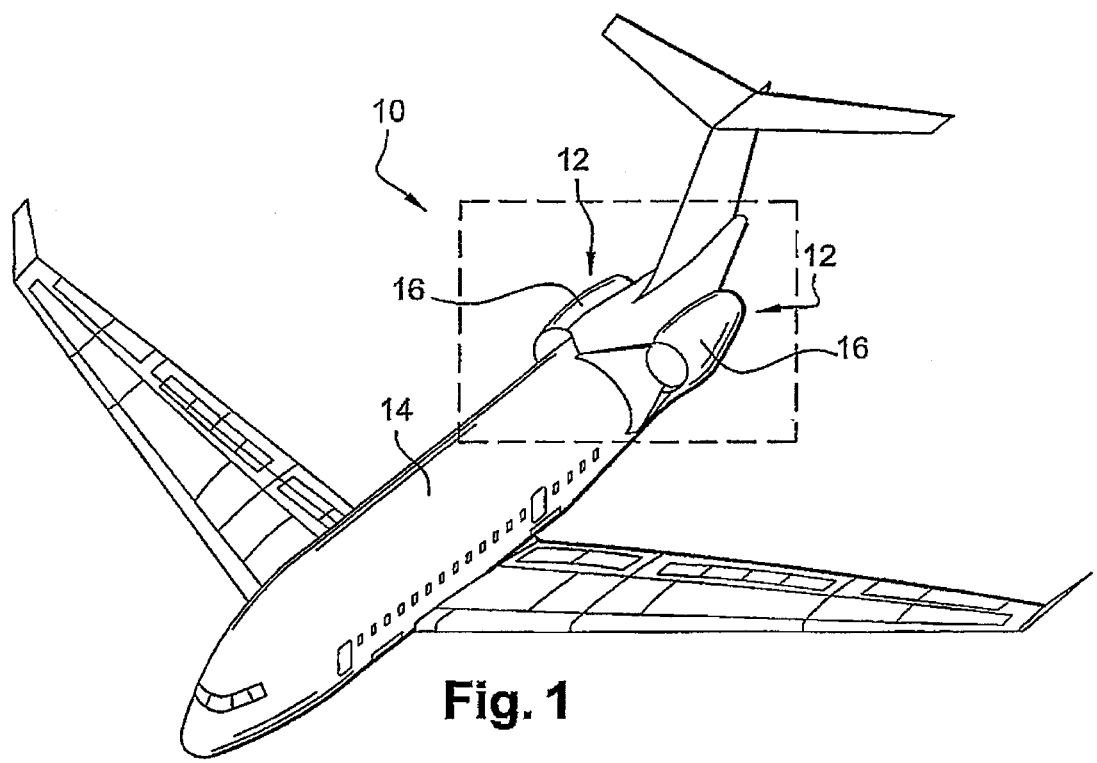
FIG. 1 is a diagrammatic view in perspective of an airplane of the invention.

Reference is made initially to FIG. 1, which shows a civil airplane 10 fitted with two turbojet engines 12 mounted on the rear portion of the airplane fuselage 14, on either side thereof.

The engines 12 of the airplane 10 comprise nacelles 16 that have their upstream portions partially embedded in the fuselage 14. This type of mount for the engines 12 in a configuration that is sometimes referred to as a "buried engine" configuration serves to eliminate the pylons and their fairings that conventionally connect the engines to the airplane, and serves to reduce the area of the nacelles that comes into contact with the air flowing around the airplane 10, thereby reducing aerodynamic drag.

In flight, a boundary layer is formed around the fuselage 14 of the airplane 10 and creates the aerodynamic drag of the airplane. In cruising flight, this boundary layer may have a thickness of the order of 30 centimeters (cm) to 40 cm for an airplane having a length of about 30 meters (m).

The invention proposes a device that enables the boundary layer formed on the fuselage 14 to be eliminated as much as possible by ingesting it inside the engine 12 of the airplane 10.

For this purpose, the air intake 18 of each engine 12 includes two walls 20 that are connected to the fuselage 14 of the airplane 10 and that flare apart from each other in an upstream direction.

The height of each wall 20 diminishes going upstream away from the air intake 18 so as to become zero at its upstream end. This variation in height associated with the convergence of these walls towards the air intake of the engine enable a maximum extent of the boundary layer to be directed towards the inside of the engine 12.

Figure 2:
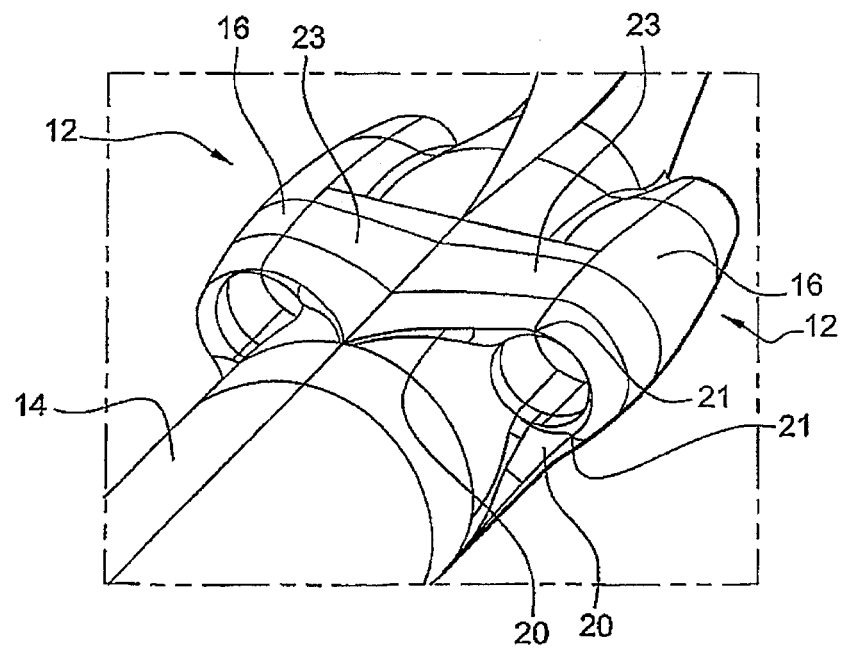
FIG. 2 is a view of a larger scale of the portion outlined in dashed lines in FIG. 1.

As can be seen in FIG. 2, the two walls 20 are connected to two points 21 of the periphery of the air intake of the engine 12, these two points 21 being substantially diametrically opposite or being spaced apart angularly from each other by an angle lying in the range about 120° to about 180°.

The angle formed by the two walls 20 lies in the range about 25° to about 50°.

The guide walls of each engine extending over the top portion of the fuselage are connected together at their upstream ends.

The guide walls of each engine may be curved with a concave side facing towards the space situated between two guide walls, thereby serving to improve the guidance of the air of the boundary layer compared with guide walls that are plane.

Fairing panels 23 extend downstream from each of these walls and connect the two engines together laterally, so as to ensure a good flow of air downstream from these walls.

Fairing panels also extend downstream from the guide walls, extending over a bottom portion of the fuselage (not shown).

Figure 3:
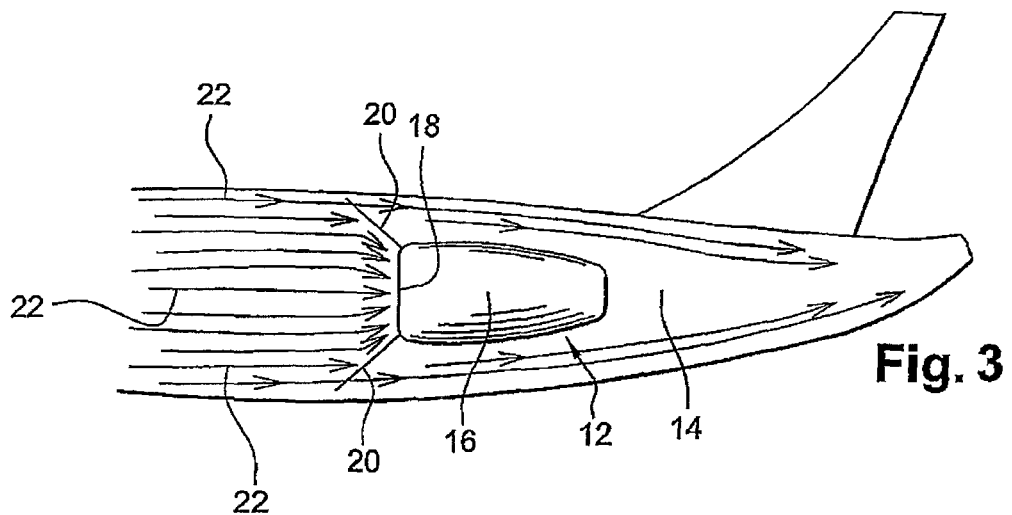
FIG. 3 is a fragmentary diagrammatic side view of an airplane of the invention.

FIG. 3 shows the streamlines 22 of the boundary layer formed on the fuselage 14 of the airplane 10. It can be seen that the streamlines 22 that are not actually in alignment with the air intake 18 of the engine 12 are brought by the guide walls 20 towards the air intake of the engine 12.

According to another feature of the invention, the surface of the fuselage situated between the two guide walls 20 have an S-shaped profile (dashed line 24 in FIG. 4) and includes a concave side beside the air intake of the engine, thereby enabling the air of the boundary layer to be accelerated and increasing the capture of the boundary layer by the engine.

The upstream portion of the nacelle 16 is partially embedded in the fuselage 14 and its downstream portion is spaced apart from the fuselage 14, thus enabling hot gas to be ejected at a distance from the fuselage 14. The embedded portion of the nacelle represents about one-third to at most half of the upstream portion of the nacelle.

Figure 4:
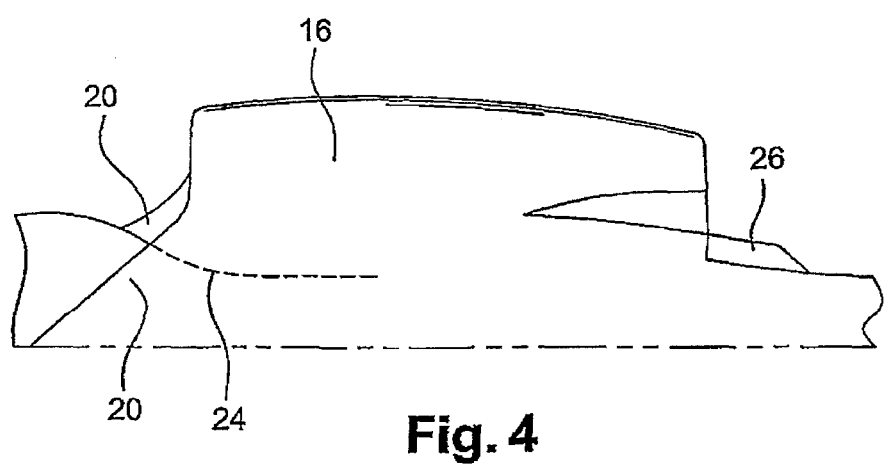
FIG. 4 is a diagrammatic plan view of an aeroengine of the invention.

As shown in FIG. 4, the downstream end of the engine 12 is connected to the fuselage via a wall 26 that is positioned substantially radially to the engine 12 and to the fuselage 14 of the airplane 10. This wall serves to protect the fuselage 14 from the hot gas ejected by the engine 12 by preventing hot gas eddies between the engine 12 and the fuselage 14 and preventing the creation of additional drag.

The combined use of guide walls 20 and of the surface of the fuselage 14 with an S-shaped profile enables about 50% of the air of the boundary layer of the fuselage 14 to be directed into the engines 12 for an engine 12 having the front portion of its nacelle embedded to about one-third in the fuselage 14.

The saving in weight and drag that results from partially embedding the nacelle 16 in the fuselage, and the absorption of a portion of the boundary layer, enable fuel consumption to be lowered by about 3% to 5%.

The invention claimed is:

1. An airplane fitted with bypass turbojet engines having nacelles that are embedded at least in part in a fuselage of the airplane,
   wherein an air intake of each engine is connected to the fuselage by two boundary layer guide walls, the guide walls of each engine extending upstream from the air intake and flaring apart from each other and from the engine in an upstream direction,
   wherein a fairing panel extends downstream from each of the guide walls of each engine and connects the engines laterally, and
   wherein the guide walls are disposed downstream of wings of the airplane.

2. An airplane according to claim 1, wherein a height of the guide walls relative to the fuselage decreases going upstream from the air intake of the engine.

3. An airplane according to claim 1, wherein the guide walls of each engine form an angle of about 25° to about 50° relative to each other.

4. An airplane according to claim 1, wherein the guide walls of each engine are curved with a concave side facing towards a space situated between the two guide walls.

5. An airplane according to claim 1, wherein the guide walls of each engine extend between the fuselage and peripheral points of the air intake that are spaced apart from the fuselage, and for which radii that connect the points to an axis of the engine form between them an angle lying in a range 120° to 180°.

6. An airplane according to claim 1, wherein a portion of the fuselage situated between the two guide walls of each engine has an S-shaped profile.

7. An airplane according to claim 1, wherein only an upstream portion of the nacelle is embedded in the fuselage.

8. An airplane according to claim 1, wherein at least one-third and at most 50% of an upstream portion of the nacelle is embedded inside the fuselage.

9. An airplane according to claim 1, wherein a downstream portion of each engine is spaced apart from the fuselage and is connected to the fuselage by a plane wall extending downstream from the engine over an entire area of a space between the engine and the fuselage.

10. An airplane according to claim 1, wherein the engines are disposed downstream of wings of the airplane.

11. An airplane fitted with bypass turbojet engines having nacelles that are embedded at least in part in a fuselage of the airplane,
    wherein an air intake of each engine is connected to the fuselage by two boundary layer guide walls, the guide walls of each engine extending upstream from the air intake and flaring apart from each other in an upstream direction,
    wherein a fairing panel extends downstream from each of the guide walls of each engine and connects the engines laterally, and wherein the guide walls are disposed downstream of wings of the airplane.

* * * * *